United States Patent [19]

Escaravage

[11] Patent Number: 4,750,759

[45] Date of Patent: Jun. 14, 1988

[54] RETURN TIGHTENER FOR A SAFETY BELT STRAP WINDER, IN PARTICULAR FOR A MOTOR VEHICLE

[75] Inventor: Gérard Escaravage, Valentigney, France

[73] Assignee: Aciers et Outillage Peugeot, Audincourt, France

[21] Appl. No.: 97,986

[22] Filed: Sep. 17, 1987

[30] Foreign Application Priority Data

Sep. 18, 1986 [FR] France ............................. 86 13081

[51] Int. Cl.$^4$ ..................... A62B 35/02; B65H 75/48
[52] U.S. Cl. ................................. 280/806; 242/107
[58] Field of Search ............ 280/806, 807, 801; 242/107, 107.4 R-107.4 E; 297/478, 480

[56] References Cited

U.S. PATENT DOCUMENTS

| | | | |
|---|---|---|---|
| 3,043,093 | 7/1962 | Stott | 280/806 |
| 4,423,846 | 1/1984 | Fohl | 280/806 |
| 4,508,288 | 4/1985 | Nilsson | 280/806 |

FOREIGN PATENT DOCUMENTS 3531856 12/1986 Fed. Rep. of Germany ...... 280/806

*Primary Examiner*—Ross Weaver
*Attorney, Agent, or Firm*—Sughrue, Mion, Zinn, Macpeak, and Seas

[57] ABSTRACT

This return tightener comprises a force accumulating device (1) which may be actuated in response to the detection of a sudden deceleration of the vehicle and is connected to a device (2) for driving a device (3) for rotationally actuating a shaft (4) of the winder, the driving device comprising a flexible driving element (9). This tightener is characterized in that the actuating device comprises a split elastically yieldable ring (5) disposed around a portion of the shaft and around which is wound a reserve portion of the flexible driving element (9), and an abutment element (6) is provided interposed between the two edges of the ring (5) to permit a free rotation of this portion of the shaft in this ring in normal operation of the winder. This abutment element (6) is connected to the flexible driving element (9) and is capable of being pulled away by the latter upon the actuation of the accumulating device (1) for releasing the edges of the ring (5) and permitting a coupling between the driving device (2) and the shaft (4) of the winder and cause the winding of the strap.

4 Claims, 1 Drawing Sheet

RETURN TIGHTENER FOR A SAFETY BELT STRAP WINDER, IN PARTICULAR FOR A MOTOR VEHICLE

The present invention relates to a return tightener for a safety belt strap winder in particular for a motor vehicle.

A number of tighteners are known in the art for the safety belt strap of a motor vehicle.

Thus, for example, the document FR-A-2 382 903 discloses a tightening device for a safety belt comprising a collision detector adapted to be fixed to the vehicle, an element which may be fixed to a safety belt and may be displaced in such manner as to exert an increased tension in the belt, and means reacting to the collision detector for producing a rapid movement of said element so as to apply said increased tension in the case of an accident involving a collision to which the detector reacts. In this device, the means reacting to the collision detector comprise a piston and cylinder arrangement, the displacemt of the piston in the cylinder being employed to exert the increased tension in the belt.

As in particular shown in FIG. 3 of this document, the piston and cylinder arrangement is connected by means of a flexible wire to a safety belt winder. The wire is pre-wound on a drum disposed on a portion of the shaft of the winder and, upon the detection of a collision, the piston acts in such manner as to pull on the wire and rapidly rotate the drum and ensure the winding of the safety belt. This drum is connected to the shaft of the winder by a clutch which is actuated either by centrifugal force when the drum rotates, or by an angular acceleration of the drum under the action of the piston.

There is also known from the document FR-A-2 491 340 a return tightener for an automatic safety belt winder of the type comprising a force accumulator which is capable of being actuated in the event of an accident and an energy converter which, after the actuation of the force accumulator, acts on the belt shaft of the automatic winder and imparts thereto a return tightening rotative movement. In this device, the energy converter is formed by a rotary roller for a pulling means which may be coupled to the belt shaft and whose pulling means are connected to the aforementioned force accumulator so as to, after the actuation of the force accumulator and after having overcome the retaining force of a retaining device, which is in this case a shear pin, ensure a junction by coupling and a return tightening movement of the belt shaft.

The devices described in these documents have a number of drawbacks, in particular as concerns the complexity of the means achieving the coupling between the pulling means and the shaft of the winder.

An object of the invention is therefore to overcome these problems and propose a device which is simple, reliable and of a relatively low cost price.

The invention therefore provides a return tightener for a safety belt strap winder, in particular for a motor vehicle, of the type comprising force accumulating means capable of being actuated in response to the detection of a sudden deceleration of the vehicle, said accumulating means being connected to means for driving means rotationaly actuating a shaft of the winder so as to impart thereto a winding rotational movement, said driving means comprising a flexible driving element, wherein the actuating means comprise a split elastically yieldable ring disposed around a portion of the winding shaft, a reserve portion of the flexible driving element being wound around the ring and an abutment element is provided in interposed relation between the edges of the ring so as to impart thereto a dimension exceeding that of said portion of the shaft of the winder and permit a free rotation of this portion of the shaft in the ring in the normal operation of the winder, said abutment element being connected to the driving means and being capable of being pulled away by the latter when the accumulating means are actuated so as to release the edges of the ring and permit a coupling, by a tightening of the ring around the shaft portion, between the driving means and the shaft of the winder so as to force the winding of the strap and therefore exert an increased tension on said strap.

A better understanding of the invention will be had from the following description which is given solely by way of example with reference to the accompanying drawings, in which.

Figure 2:
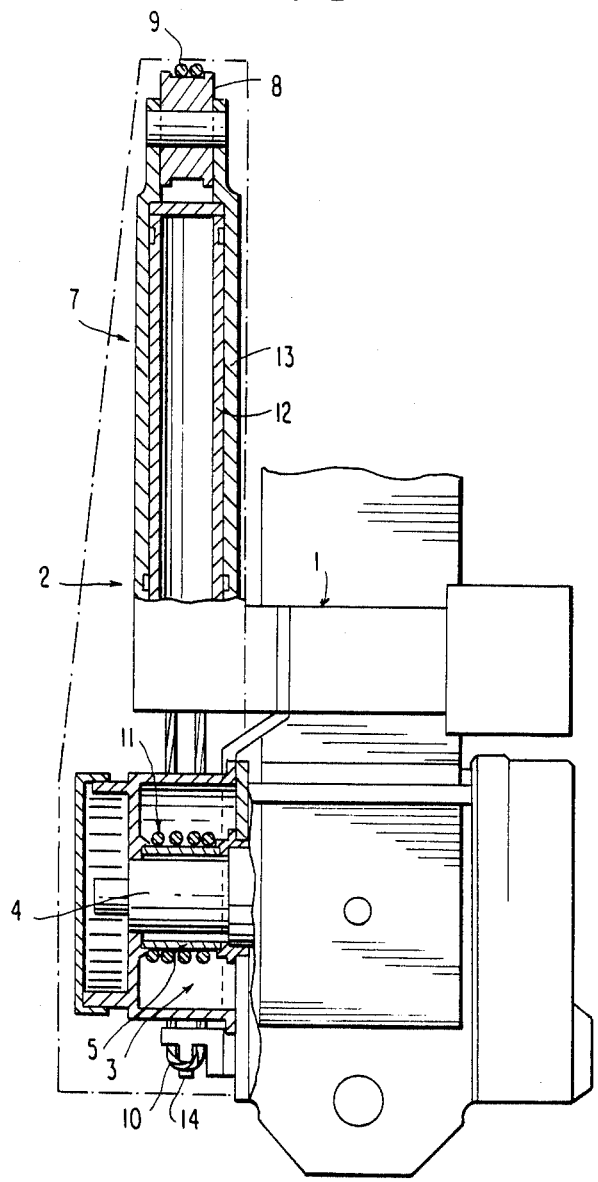
FIG. 2 is a front elevational view partly in section of a device according to the invention.
Figure 1:
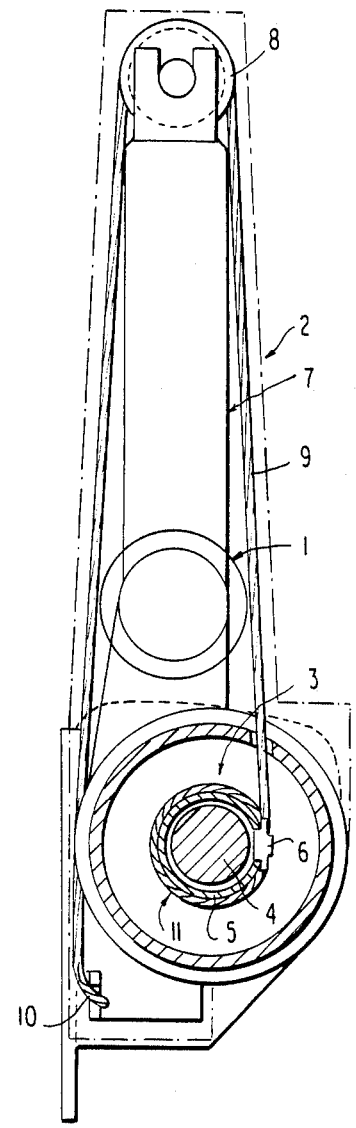
FIG. 1 is a side elevational view partly in section of a device according to the invention.

As can be seen in FIGS. 1 and 2, the return tightener for a safety belt strap winder according to the invention is a adapted to a winder of known type and includes force accumulating means 1, such as, for example, a pyrotechnic cartridge which may be actuated in response to the detection of a sudden deceleration of the vehicle. These means are connected to driving means 2 for means 3 rotationally actuating a shaft 4 so as to impart thereto a rotational winding movement. These actuating means comprise a split elastically yieldable ring 5 disposed around a portion of the shaft 4 of the winder. An abutment element 6 is interposed between the two edges of the split ring in order to impart thereto a dimension exceeding that of the shaft of the winder and permit a free rotation of this shaft portion in the ring in normal operation of the winder.

This abutment element is connected to the driving means 2 and is capable of being pulled away by the latter upon an actuation of the accumulating means so as to release the edges of the ring and permit a coupling, by a tightening of the ring around the shaft portion, between the driving means and the shaft of the winder and cause the winding of the strap and therefore exert an increased tension on the latter.

For this purpose, the force accumulating means are connected to a device 7 constituting a jack comprising a part which is movable relative to another part in response to an actuation of the accumulating means. This movable part includes a return element, for example constituted by a pulley 8, for or a flexible driving element 9 which is part of the driving means and may be, for example, constituted by a flexible wire having one end 10 fixed to the winder and another end 11 wound around the ring. Advantageously, the abutment element is connected to the flexible driving element, so as to be pulled away by the latter upon an actuation of the accumulating means.

Thus, subsequent to the detection of a sudden deceleration of the vehicle, the force accumulating means are actuated, and result in a very rapid movement of the movable part of the means 7 forming a jack and therefore of the pulley 8. As one of the ends of the flexible driving element is fixed to the winder, and as this driving element passes around the pulley, this results in a pull being exerted on the driving element, a pulling away of the abutment element, and a tightening of the ring around the shaft portion resulting in a coupling between the driving means 2 and the shaft of the winder which brings about the winding of the strap.

Figure 3:
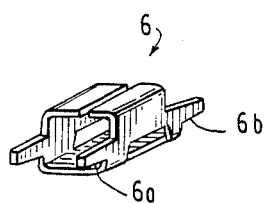
FIG. 3 is a perspective view of an abutment element which is part of the construction of a device according to the invention.

As shown in FIG. 3, the abutment element 6 has two bearing surfaces 6a, 6b adapted to cooperate with the edges of the split ring 5 for maintaining them spread apart.

With reference again to FIG. 2, it will be seen that the means 7 constituting a jack comprise two tubes 12 and 13 disposed one inside the other. The inner tube 12 is fixed and connected to the force accumulating means 1 and the outer tube 13 is movably mounted relative to the inner and carries at one of its ends the return element 8 for the flexible driving element.

Note that this flexible driving element 9 may be doubled, i.e. this element is wound on a fixing tab 14 of the winder, passes around the return element 8 and the two free ends of the element are then wound around the split ring 5.

The force accumulating means may be disposed in the inner tube 12 of the means constituting a jack, which results in a large economy of space.

What is claimed is:

1. A return tightener for a safety belt strap winder in particular for a motor vehicle, comprising force accumulating means actuatable in response to the detection of a sudden deceleration of the vehicle, a shaft of said winder means for rotationally actuating said shaft so as to impart thereto a rotational strap winding movement, and drivingly connected to said means for rotationally actuating said shaft, said accumulating means being connected to said driving means, said shaft actuating means comprising a split elastically yieldable ring disposed around a portion of said winding shaft, and defining two opposed edges, a reserve portion of said flexible driving element being wound around said ring, an abutment element interposed between said two opposed edges of the ring so as to impart to the ring a dimension exceeding the dimension of said shaft portion of the winder and permit a free rotation of said shaft portion in said ring in normal operation of the winder, said abutment element being connected to the driving means and being capable of being pulled away by said driving means upon actuation of said accumulating means so as to release said edges of the ring and permit a coupling between said driving means and said shaft portion of the winder, by a tightening of said ring around said shaft portion and thereby force the winding of said strap and therefore exert an increased tension on said strap.

2. A tightener according to claim 1, wherein said abutment element is connected to said flexible driving element.

3. A tightener according to claim 1, wherein said abutment element comprises two bearing surfaces cooperative with said edges of the split ring to maintain said edges spread apart in a normal operation of the winder.

4. A tightener according to claim 2, wherein said abutment element comprises two bearing surfaces cooperative with said edges of the split ring to maintain said edges spread apart in a normal operation of the winder.

* * * * *